May 6, 1952 R. S. GAUGLER 2,596,021
REFRIGERATING APPARATUS
Filed April 8, 1950 2 SHEETS—SHEET 1

INVENTOR.
RICHARD S. GAUGLER.
BY
Willits, Hardman & Fehr.
HIS ATTORNEYS

May 6, 1952     R. S. GAUGLER     2,596,021
REFRIGERATING APPARATUS
Filed April 8, 1950     2 SHEETS—SHEET 2
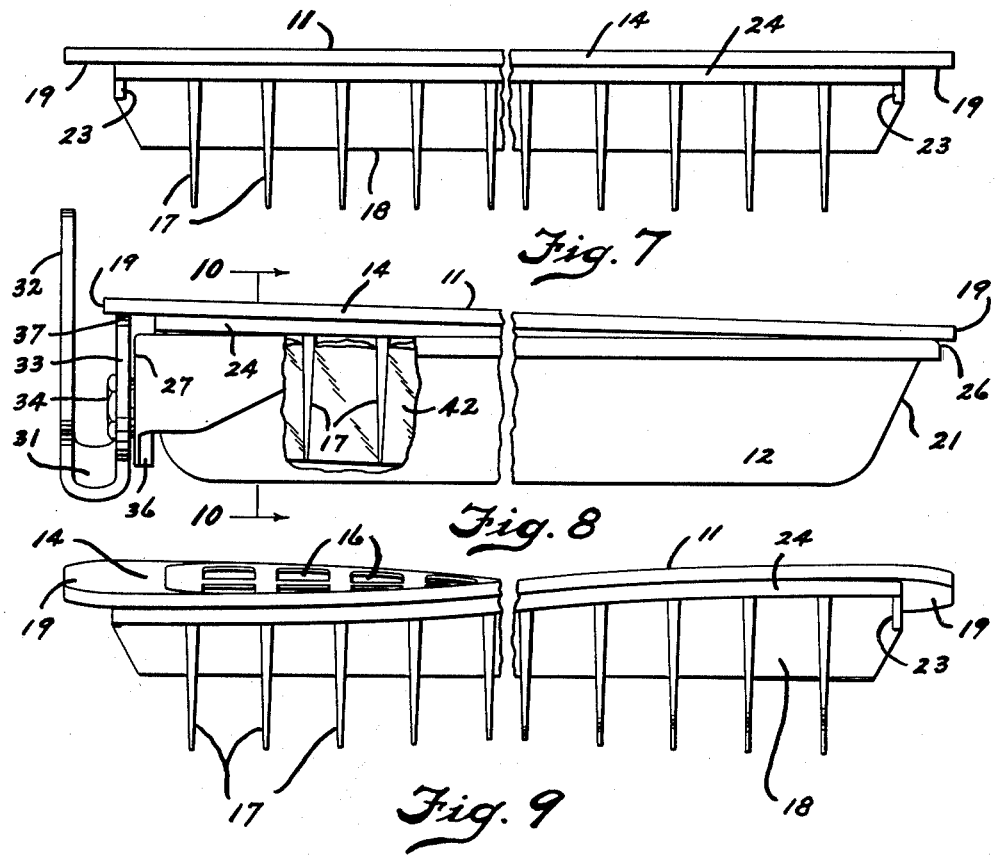
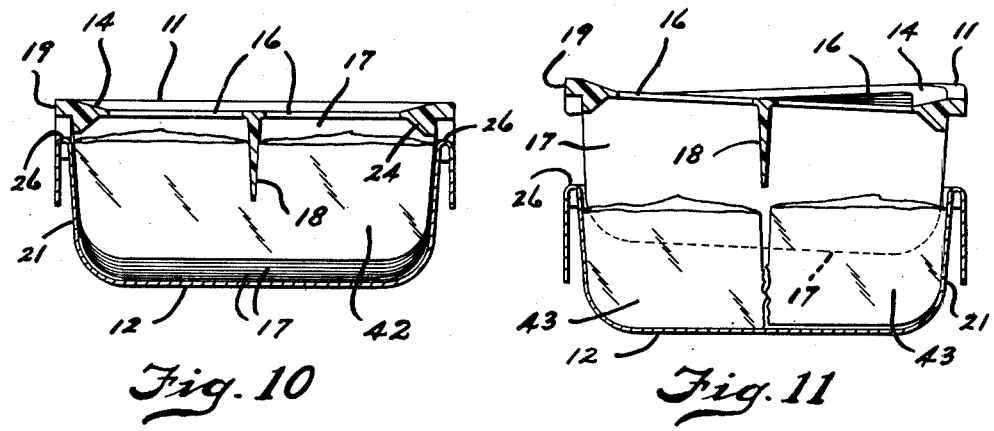
INVENTOR.
RICHARD. S. GAUGLER.
BY
Willits, Hardman & Fehr.
HIS ATTORNEYS Patented May 6, 1952

2,596,021

UNITED STATES PATENT OFFICE 2,596,021

REFRIGERATING APPARATUS

Richard S. Gaugler, Dayton, Ohio, assignor to General Motors Corporation, Dayton, Ohio, a corporation of Delaware Application April 8, 1950, Serial No. 154,770

5 Claims. (Cl. 62—108.5)

This invention relates to freezing devices of the ice tray and grid type generally employed in the freezing compartment of household refrigerators.

The present invention relates particularly to an improvement over the freezing device disclosed in my copending application Serial No. 116,293, filed September 17, 1949.

Ice blocks harvested from a freezing device of a household refrigerator are employed by the user of the refrigerator for various purposes and frequently the ice blocks formed in the device and harvested therefrom are found to be either too large or of such shape that they must be manually cracked or chipped into smaller pieces for certain uses. At one time large pieces or cubical-like blocks of ice may be desired for insertion into large diametered drinking glasses, wide mouthed insulated jugs and insulated bottled beverage carrying cases or containers wherein relatively slow melting of the ice is desired. At another time relatively small pieces or sticks of ice may be desired in order to permit the ice to be inserted into tall narrow diametered glasses, narrow mouthed insulated bottles and narrow mouthed sick-room receptacles wherein more rapid melting of the ice may be desirable.

It is an object of my present invention to provide an improved freezing device for use in household refrigerators and a novel method of harvesting ice therefrom.

Another object of my invention is to provide a single freezing device with similarly formed compartments from which ice pieces of different geometric shapes can be harvested.

A further object of my invention is to provide an improved freezing device comprising a tray adapted to contain a body of water to be frozen and a grid removably disposed in the tray having walls forming, when water is frozen in the tray, separate ice blocks having a substantial portion thereof extending continuously from one side to the opposite side of the tray and at least another wall for scoring the ice blocks along desired lines intermediate their ends.

It is a still further object of my invention to provide a freezing device of the type described in the foregoing objects with a distortable resilient molded plastic grid and means carried by the tray thereof for elevating the grid relative to the tray whereby the grid may be manually flexed to progressively and/or simultaneously separate the ice blocks along their scorings into smaller ice blocks and to release the ice from the grid.

A more specific object of my invention is to provide a freezing device comprising a tray and a grid therefor having a top portion and walls depending therefrom into the tray at different distances relative to one another so that when the tray is only partially filled with water and the water frozen therein, long relatively narrow sticks of ice of small height can be harvested therefrom and when substantially filled with water and the water frozen therein, short blocks of ice of relatively great height can be harvested therefrom.

Further objects and advantages of the present invention will be apparent from the following description, reference being had to the accompanying drawings, wherein a preferred form of the present invention is clearly shown.

In the drawings:

Fig. 7 is a side view of the grid;

Fig. 8 is a side view of the freezing device showing the grid thereof together with ice adhering thereto elevated relative to the tray;

Fig. 9 is a view showing the grid in the form it takes when twisted;

Fig. 10 is a sectional view taken on the line 10—10 of Fig. 8 showing an ice block extending continuously across the tray and scored centrally thereof; and Fig. 11 is a sectional view similar to Fig. 10 showing the grid twisted and the continuous ice blocks split along their line of scoring and released from the grid.

Figure 1:
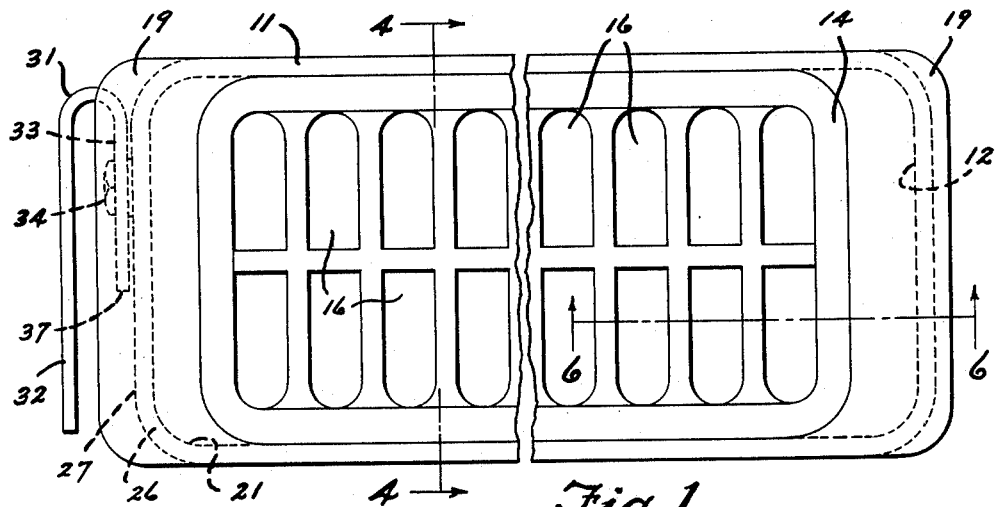
Fig. 1 is a top plan view of my improved freezing device.
Figure 2:
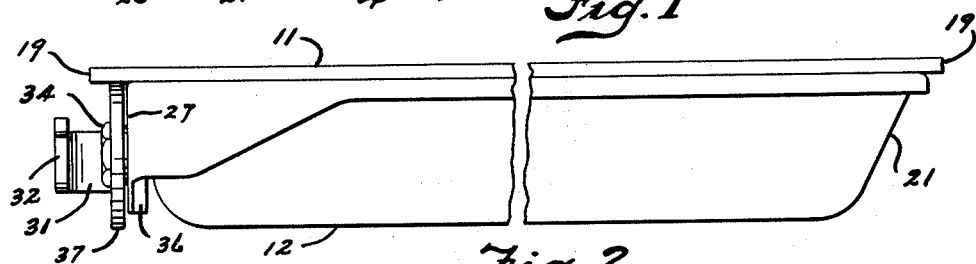
Fig. 2 is a side view of the device shown in Fig. 1.
Figure 3:
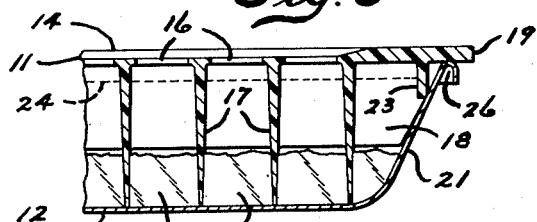
Fig. 3 is an end view of the freezing device showing means on the tray for elevating the grid relative thereto.

Referring to the drawings, for illustrating my invention, I have shown in Figs. 1, 2 and 3 thereof a freezing device for containing water and adapted to be placed in the freezing compartment of an evaporator mounted in a household refrigerator or in a freezing compartment provided in the refrigerator. The freezing device comprises a one-piece grid structure 11 and a sheet metal, preferably aluminum, tray 12. The grid 11 is molded of any suitable moldable plastic compound having the desired characteristics as distinguished from stretchable rubber material. The molded plastic grid is distortable and sufficiently resilient to return to its original shape after having been twisted or distorted and is of such nature that it affords a means of applying pressure to ice blocks formed therein. Since moldable plastic compounds suitable for use in making a grid structure of the type disclosed have as their main ingredient a material which produces molded surfaces that are water repellant, water will not adhere to such surfaces and the frozen bond between ice and its contacting walls is a mechanical bond rather than a bond due to adherence between molecules. Therefore, such surfaces greatly facilitate loosening of a grid from ice in a device of the type herein disclosed. The present grid structure 11 is therefor molded from polymerized ethylene material commonly called polyethylene and known to the trade as "Polythene."

Figure 4:
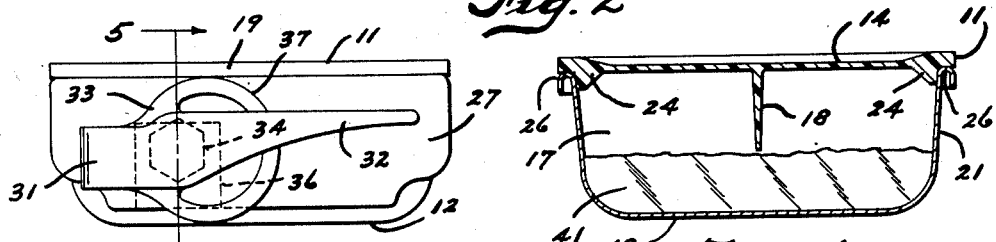
Fig. 4 is a sectional view taken on the line 4—4 of Fig. 1 and showing water frozen in the device in the form of long narrow sticks.
Figures 5, 6:
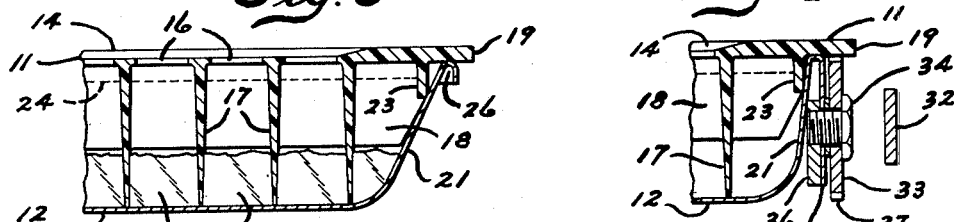
Fig. 5 is a sectional view taken on the line 5—5 of Fig. 3 showing the mounting of the grid elevating means on the tray.
Fig. 6 is a fragmentary sectional view taken on the line of 6—6 of Fig. 1 showing the difference in the distance of extension of a certain wall of the grid into the tray relative to other walls thereof.

Grid unit 11 comprises a reticulated top or cover portion 14, wherein the reticulations are formed by a plurality of openings 16, and integral vertical walls 17 and 18 depending therefrom (see Figs. 6 and 7). The walls 17 and 18 are each tapered in cross-section by being thicker at their upper portion than at their lower edge. The set of walls 17 are spaced apart longitudinally of the grid 11 and extend from the top 14 to the bottom wall of the tray 12. The wall 18 is arranged parallel to the length of grid 11 and extends from top 14 to a point substantially midway between the top of transverse walls 17 and their lower edge. Thus the lower edge of wall 18 is spaced a substantial distance from the bottom wall of tray 12. Walls 17 and 18 of grid 11 divide the interior of tray 12 intermediate its top and bottom into a lower portion wherein the transverse walls 17 form a row of relatively long narrow compartments for a purpose to be hereinafter described and an upper portion wherein the longitudinal wall 18 forms a scoring means for a purpose to be presently described. The top portion 14 of grid 11 has outwardly extending peripheral edge parts 19 overlapping the top of upright walls 21 of tray 12 and it will be noted (see Figs. 2 and 6) that edge parts 19 extend outwardly over the ends of tray 12 a greater distance than over the sides of the tray for a purpose to be hereinafter described. Grid 11 also has short depending walls 23 at the ends thereof (see Figs. 5 and 6) which are continuations of a thickened part 24 (see Fig. 4) of the top portion 14 thereof and extending along its long sides. Walls 23 and the thickened part 24 of grid 11 cooperate with one another to form a continuous flange around the grid which depends a short distance into the tray 12 and serves to facilitate locating the grid in its proper position within the tray.

The upright walls 21 of tray 12 are bent or rounded over, as at 26 (see Figs. 4 and 6), to form a rim around the tray and this rounded-over portion includes a wall 27 depending a substantial distance downwardly from the rim of the tray at one end thereof (see Figs. 3 and 5). Wall 27 serves to increase the structural strength of tray 12 and provides a mounting for a lever means. A lever 31 having a handle 32 and a mounting portion 33 is pivotally mounted upon the tray 12 by a stud 34 which passes into an opening in the end wall 27 and is suitably secured to a metal piece 36 located in back of wall 27 (see Fig. 5). Mounting portion 33 of lever 31 has a cam 37 formed thereon (see Fig. 3) which serves to release the freezing device from its support in an evaporator or cooling element and also serves to elevate the grid and ice adhering thereto relative to the tray as will be presently described. It will be noted that the lever 31 is pivotally mounted at one side of the end of tray 12 and that the center of the circular cam 37 is offset relative to the lever mounting.

When ice is desired to be formed in the present device the grid 11 is placed in tray 12 and the device is held over a sink and water or other liquid to be frozen is run from a faucet into the tray through the openings 16 in the top of grid 11. If it is desired to obtain long narrow sticks of ice of short height from the device, the tray is only partly filled with water such, for example, to a level adjacent the bottom edge of grid wall 18. The device containing the body of water is placed in a freezing compartment of a refrigerator or in an evaporator or cooling element of a refrigerating system associated with the refrigerator and located within a compartment thereof to be cooled. After this shallow body of water in tray 12 has been frozen into long narrow ice sticks 41 (see Fig. 4), separated from one another by the transverse grid walls 17 and extending entirely across the tray, the freezing device is removed from the evaporator and the ice sticks 41 may then be harvested therefrom. Handle 32 of lever 31 is moved downwardly or in a clockwise direction about its mounting to rotate cam 37 against the freezing support for the device and a force applied thereto causes the cam 37 to break the ice bond between the device and its support whereupon the freezing device, comprising grid 11 and tray 12, can be readily removed from its support. Thereafter lever 31 is moved upwardly or in a counterclockwise direction about its pivotal mounting to rotate cam 37 against the overhanging end part 19 of grid 11 and a slight force applied thereto will elevate grid 11 and the ice sticks 41 adhering thereto relative to and upwardly of tray 12 to an inclined position such, for example, as is illustrated in Fig. 8 of the drawings. Since more of the exterior surface area of the ice sticks 41 contacts the grid walls 17 than that contacting the tray, the bond between the ice sticks and the tray walls is readily broken and the sticks remain bonded to the grid walls during elevation of the grid relative to the tray. Ice blocks formed between walls of the resilient grid adds rigidity thereto and causes the grid together with the ice blocks adhering thereto to be bodily elevated relative to the tray without loosening the blocks. In order to release the ice sticks 41 from grid 11 and its walls 17, the operator grasps each of the adjacent end parts 19 of the grid and applies a twisting or distorting force to the grid which causes movement of the tapered grid wall 17 relative to the ice sticks and breaking of the bond therebetween to release the ice sticks 41 therefrom whereupon they may fall back into the tray 12 or may be collected in any other suitable or desirable receptacle. Such a twisted or distorted position of the resilient grid is illustrated in Fig. 9 of the drawings and it is to be understood that after ice sticks have been released therefrom the grid again assumes its original position shown in Fig. 7. The ice sticks 41 are of such size and shape as to permit them to be inserted into tall narrow glasses, narrow mouthed insulated "Thermos" bottles or narrow mouthed sickroom receptacles such for example as ice bags or caps and the like. The plurality of long exposed surfaces of such ice sticks 41 provide for rapid refrigeration or cooling of the water or other substance in the glasses, bottles, caps or bags mentioned.

When ice blocks of a different shape and size, such as blocks of a more cubical shape, are desired to be obtained from the present device the tray 12 is substantially filled with water so that the level thereof is slightly below the top 14 of grid 11. In case the tray is filled too full of water, the excess water may be removed from the device by causing it to flow outwardly thereof through the openings 16 in the top portion 14 of grid 11. Openings 16 will also permit the water upon freezing to expand upwardly therethrough so as not to disturb the normal position of the grid relative to the tray. Upon freezing the substantially filled tray of water the grid together with ice adhering thereto is elevated relative to the tray in the manner hereinbefore described and as shown in Fig. 8 of the drawings. The ice blocks 42 are separated from one another by the grid walls 17 and they extend or at least have a substantial portion thereof extending continuously across the tray 12 from one side to the opposite side thereof (see Fig. 10). It should be noted that the longitudinal grid wall 18 has scored or marked the upper portion end surface of the ice blocks 42 along lines intermediate their ends. In the present invention this scoring of the ice blocks 42 is to be distinguished from prior devices wherein a grid wall or partition extends from the top to the bottom of a tray and divides the ice into separate cubical-like blocks. These ice blocks 42, if harvested from the device in their continuous form as illustrated in Fig. 10, would be too large for general purposes or uses and therefore the scoring thereof as described permits them to be broken into smaller blocks as will now be explained. After the grid and ice adhering thereto has been elevated relative to the tray, as shown in Fig. 8 in the drawings, the operator grasps each of the edge end parts 19 of the grid and raises the grid and ice farther upwardly of tray 12. The operator then applies a distorting force to the grid 11 to twist it and cause its walls 17 and also wall 18 to move relative to the ice blocks whereupon the twisting of the wall 18 applies force to the continuous ice blocks 42 and splits them apart into the form of a plurality of smaller blocks 43 and simultaneously releases the smaller ice blocks from the grid walls (see Fig. 11). The plurality of small ice blocks 43 may fall back into the tray 12 or they may be collected in any other suitable receptacle. These blocks of ice 43 are ordinarily suitable for insertion into large diametered glasses, wide mouthed "Thermos" jars or jugs and insulated bottled beverage carrying cases wherein a more prolonged refrigeration is desired over the rapid refrigeration obtained in the use of the long narrow ice sticks as hereinbefore described.

I have shown and described simultaneously splitting apart and releasing all of the ice blocks from the grid, after elevation of the grid and ice relative to the tray, and dropping of the ice blocks back into the tray. After this operation has been carried out any desired numbers of ice blocks can be readily harvested from the tray by sliding them up the inclined tray end wall to remove them therefrom. However, the device is such that it lends itself capable of different operations to meet various requirements. For example, the user of the device may desire to remove only a few of the ice blocks from the grid at one time. This desire may be fulfilled by turning the elevated grid and ice adhering thereto upside down and then applying a twisting force to one end of the grid sufficient to release only the desired number of ice blocks therefrom while permitting others to remain bonded to and positioned in the grid. After this operation has been performed the grid and the other ice blocks therein may be placed upon the freezing support in an upside down position so that the top portion of the grid rests upon the support. When it is desired to harvest more ice blocks from the grid it is removed from the freezing support and again twisted to release the desired number of ice blocks therefrom.

From the foregoing it should be apparent that I have made an improvement in freezing devices for use in household refrigerators by providing a device and a novel method of harvesting ice therefrom which will produce ice blocks of different geometric shapes and sizes. My improved freezing device is of the same shape and size as devices now in universal use and can be substituted therefor in order to afford the users of existing mechanical refrigerators a choice in the shape and size of ice blocks to be formed in and harvested from their refrigerator to meet various requirements of pieces of ice about the home. My invention permits the formation of ice pieces for specific purposes and thereby eliminates the necessity of manually cracking large blocks of ice into smaller pieces after they have been harvested from a freezing device of the type comprising a tray and a grid.

While the form of embodiment of the invention as herein disclosed, constitutes a preferred form, it is to be understood that other forms might be adopted, as may come within the scope of the claims which follow.

What is claimed is as follows:

1. A freezing device comprising in combination, a tray adapted to contain a body of water to be frozen, said tray having a bottom which is continuously flat throughout its extension intermediate side and end walls thereof, a resilient grid capable of being manually distorted removably disposed in said tray, said grid including a set of transverse walls extending from said flat bottom of the tray to substantially the top thereof in spaced apart relation to form, when water is frozen therein, separated individual ice blocks extending continuously from one of said side walls to the opposite side wall of said tray, said grid also having a longitudinal wall formed integral with said set of transverse walls, said longitudinal wall depending into the tray and having its lower edge spaced a substantial distance above said continuous flat bottom thereof to score the upper portion and surface of the separated ice blocks intermediate their ends, and means for elevating said grid together with ice blocks adhering thereto relative to said tray whereby said grid may be distorted to split the ice blocks apart along said scorings into a plurality of smaller ice blocks and to simultaneously cause their release from said grid.

2. A freezing device comprising in combination, a tray adapted to contain a body of water to be frozen, said tray having a bottom which is continuously flat throughout its extension intermediate side and end walls thereof, a resilient grid capable of being manually distorted removably disposed in said tray, said grid including a set of transverse walls extending from said flat bottom of the tray to substantially the top thereof in spaced apart relation to form, when water is frozen therein, separated individual ice blocks extending continuously from one of said side walls to the opposite side wall of said tray, said grid also having a longitudinal wall formed integral with said set of transverse walls, said longitudinal wall depending into the tray and having its lower edge spaced a substantial distance above said continuous flat bottom thereof to score the upper portion and surface of the separated ice blocks intermediate their ends, said grid having a part thereof extending from said walls and overlapping one of said tray end walls, and manually actuated means carried by said one tray end wall for engaging said overlapping part of said grid to elevate the grid together with ice blocks adhering thereto relative to said tray whereby said grid may be bodily distorted to split the ice blocks apart along said scorings into a plurality of smaller ice blocks and to simultaneously cause their release from said grid.

3. An elongated resilient ice tray grid capable of being manually distorted to release ice blocks therefrom, said grid comprising a set of longitudinally spaced apart upright walls extending transverse to the length thereof and adapted to engage the bottom and side walls of a continuously flat bottomed wall tray for dividing the interior thereof into a row of narrow relatively long separated individual compartments, said grid also comprising another upright wall formed integral with said transverse walls and extending parallel to the length of the grid, and said another wall having its lower edge terminating intermediate the top and bottom of said transverse walls to form an ice scoring means across the upper portion of each of the separated individual compartments.

4. An ice tray grid as defined in claim 3 wherein all the upright walls thereof are tapered upwardly from their lower edge to their top portion.

5. An elongated resilient ice tray grid capable of being manually distorted to release ice blocks therefrom, said grid comprising a set of spaced apart upright walls all extending substantially parallel to one another in the same direction and adapted to engage the bottom and two opposed upwardly directed walls of a continuously flat bottomed wall tray for dividing the interior thereof into a row of narrow relatively long separated individual compartments, said grid also comprising at least another upright wall formed integral with and extending substantially at right angles to the walls of said set thereof, and said another wall having its lower edge terminating intermediate the top and bottom of said set of walls to form an ice scoring means across the upper portion of each of said separated individual compartments.

RICHARD S. GAUGLER.

REFERENCES CITED

The following references are of record in the file of this patent:

UNITED STATES PATENTS

| Number | Name | Date |
|---|---|---|
| 2,163,705 | Saler | June 27, 1939 |
| 2,190,610 | Reeves | Feb. 13, 1940 |
| 2,259,219 | Strickland | Oct. 14, 1941 |
| 2,433,210 | Gits | Dec. 23, 1947 |